(12) United States Patent
Senshu (10) Patent No.: US 6,628,586 B1
(45) Date of Patent: Sep. 30, 2003

(54) OPTICAL DISK AND RECORDING AND/OR REPRODUCING APPARATUS AND METHOD

(75) Inventor: Susumu Senshu, Kanagawa (JP)

(73) Assignee: Sony Corporation, Tokyo (JP)

( * ) Notice: Subject to any disclaimer, the term of this patent is extended or adjusted under 35 U.S.C. 154(b) by 396 days.

(21) Appl. No.: 09/712,839

(22) Filed: Nov. 15, 2000

(30) Foreign Application Priority Data

Nov. 22, 1999 (JP) ............................................. 11-331892

(51) Int. Cl.[7] ................................................. G11B 7/00
(52) U.S. Cl. .................................. 369/47.22; 369/59.21
(58) Field of Search ........................... 369/44.13, 275.3, 369/47.27, 47.28, 47.22, 59.21

(56) References Cited

U.S. PATENT DOCUMENTS 5,148,422 A * 9/1992 Sako et al. ............... 369/44.26
6,088,307 A * 7/2000 Fushimi et al. .......... 369/44.13
6,167,022 A * 12/2000 Ishida et al. ............. 369/44.13

* cited by examiner

*Primary Examiner*—Nabil Hindi
(74) *Attorney, Agent, or Firm*—Oblon, Spivak, McClelland, Maier & Neustadt, P.C.

(57) ABSTRACT

When the optical disk is at a high density, the presence of a defect of the same size can produce a great effect on data in the user data area and ID in the address area. The ID detector 23 detects the address data ID following the address marks AM stored in the address area of the optical disk 10, samples the ID following the address marks AM by using the data clock corresponding to the frequency of the wobble signals detected by the signal detector 22 to obtain ID information.

9 Claims, 9 Drawing Sheets

OPTICAL DISK AND RECORDING AND/OR REPRODUCING APPARATUS AND METHOD

BACKGROUND OF THE INVENTION

1. Field of the Invention

This invention relates to an optical disk in which address data in pit train are preformatted and a recording and/or reproducing apparatus and method for recording and/or reproducing data for the optical disk.

2. Description of Related Art

Examples of optical disks of the WO (write once) type and the rewritable type include magneto-optical disk and Digital Versatile Disc (DVD)-RAM according to the ISO (International Organization for Standardization) standards. These optical disk records desired data by the sector by referring to the address data recorded in the disk by prepit beforehand. In other words, the sector position can be identified by the prepit header (address).

Figure 1A:
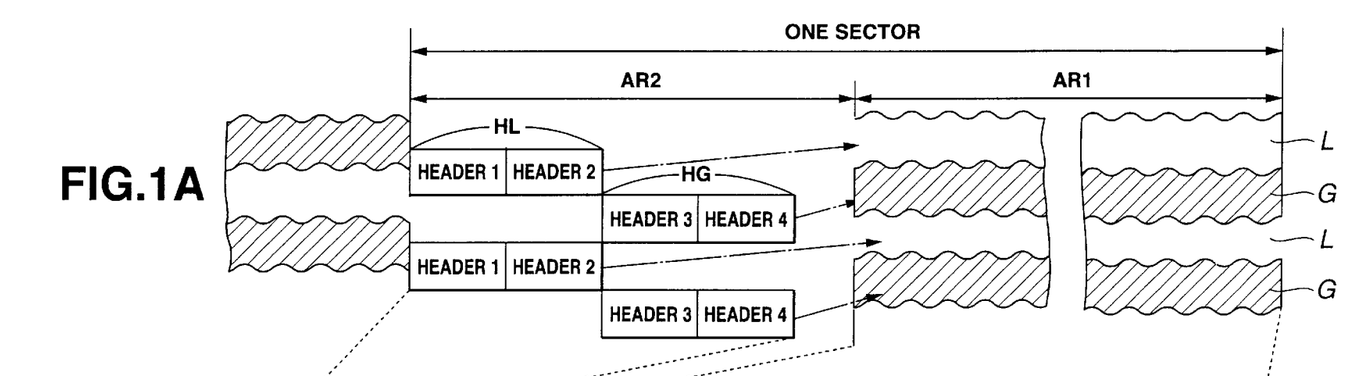
FIGS. 1A, 1B, and 1C are format diagrams of the address area and the users area of a prior optical disk.

The case of DVD-RAM will be described here as an example of the formation of prepit header. As FIG. 1A shows, an address area AR2 which will be said prepit header is formed at the head of the sector and the addresses of the groove (groove G) and land (land L) of the following user area AR1 are recorded. The record reproducing apparatus reads this address area AR2, confirms that this is the desired address, and then records or reproduces data to or from the land L/groove G of the user area AR1 following the header.

The pit train of headers on the address area AR2 is disposed in such a way that its center in the radial direction may fall on the prolongation of the boundary between a land L and a groove G. For this reason, the prepit header can be reproduced either on the prolongation of the land L or that of the groove G.

However, the contents of the prepit header themselves are in a similar shape as those of ISO-MO stored only on the groove G (the land L).

Figure 1B:
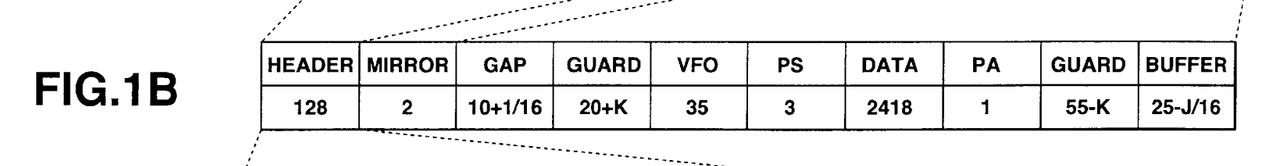

In other words, the header $H_L$ (header 1 and header 2) of the address area AR2 shows the address of the following land L. And the header $H_G$ (header 3 and header 4) shows the address of the following groove G. The header $H_L$ and the header $H_G$ altogether account for 128 bytes as shown in FIG. 1B.

Figure 1C:
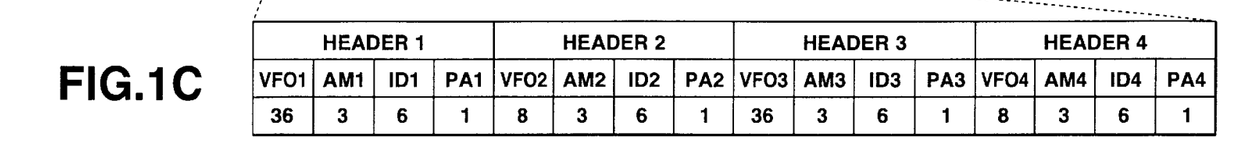

The details of this value 128 bytes are shown in FIG. 1C. Within the header $H_L$, the header 1 consists of a VFO (variable frequency oscillator) used for PLL phase locking of 36 bytes, an address mark (AM) which is a synchronization signal for headers of 3 bytes, ID of 6 bytes constituted by a physical ID (PID) which takes the form of either a track address, a sector address, a segment address or other ID information of 4 bytes and its parity PED (PID error detection code, EDC) of 2 bytes, and a postamble (PA) of 1 byte added to terminals of modulation. Here, VFO is a consecutive repetitive data pattern for assuring the reproduction of data even when the disk rotation is subjected to any variation. The remaining header 2 of the header $H_L$ is composed in the same way as the header 1 except that the VFO contains 8 bytes. In these two headers, a same ID is repeatedly recorded twice. And the header 3 and the header 4 of the header $H_G$ have a similar relationship.

The composition with a particular attention paid on the header 1 and the header 2 of the header $H_L$ is shown in the following table 1. Each ID is subjected to an EFM (eight fourteen modulation) for each byte, and a recording pattern further subjected to a NRZI (non-return-to-zero inverted recording) modulation forms the pit.

TABLE 1

| | | | |
|---|---|---|---|
| VFO1 | 36 | 288 | 576 |
| AM1 | 3 | 24 | 48 |
| ID1 | 6 | 48 | 96 |
| PA1 | 1 | 8 | 16 |
| VFO2 | 8 | 64 | 128 |
| AM2 | 3 | 24 | 48 |
| 1D2 | 6 | 48 | 96 |
| PA2 | 1 | 8 | 16 |
| Total | 64 bytes | 512 bits | 1,024 ch |

As the modulation mode of ID used in the DVD-RAM is the EFM (eight fourteen modulation) mode, 1 byte=8 bits of ID is modulated into 16 channel bits (ch). Actually, VFO, AM, etc. which are not data arranged by the bit show values converted in the same way as ID. Incidentally, AM and PA are claimed to be unique patterns that cannot be found in EFM.

Due to a shift toward shorter wavelength in laser and higher N/A ratio of the optical system in recent years, efforts have been made to advance towards a still higher density of recording in the user area. As a natural consequence, in redundant preheaders for the user area, a shift towards a higher density is also sought.

At a high density, a defect of the same size will produce a greater effect to data in the user data area AR1 and ID in the address area AR2. And an attempt to promote a shift towards a higher N/A ratio may take the form of a thinner disk substrate in order to secure the skew margin. However, a thinner disk substrate will make the effect of dusts and scratches more remarkable. These defects will cause errors in user data and ID. Since ID is used to manage and control the recording and reproduction of user data, ID errors must be minimized.

In reproducing ID in the address area AR2, it is possible to address to small errors by transforming ID (PID) into error correction codes (PED). However, in view of essentially little information contained as ID, the signal cannot be expanded to a large size, and many errors cannot be corrected. And the presence of any defect in an area used for PLL phase locking (including VFO area) affects the whole header (ID) and can disrupt the process of error correction. This is because, as shown in Table above, generally in the DVD-RAM disk format, the VFO area account for a substantial part of the preheader.

In other words, an ordinary prepit header requires a relatively large VFO area for PLL phase locking as compared with an ID area, and the presence of any defect in an area used for PLL phase locking including the VFO area produces adverse effects on the whole header (ID).

SUMMARY OF THE INVENTION

It is therefore an object of the present invention to provide an optical disk capable of eliminating the effects of any defect to the whole header.

It is another object of the present invention to provide an optical disk recording and/or reproducing apparatus rendering the PLL for address demodulation unnecessary and capable of reducing the circuit size.

In one respect, the present invention provides an optical disk in which an address information area having address information recorded therein beforehand and a recording and reproducing area are alternately arranged, wherein an address mark for indicating the start of an area is arranged at the head of the address information area, and the address mark is followed by the address information.

In another respect, the present invention provides a recording and/or reproducing apparatus for recording and/or reproducing data on an optical disk in which an address information area and a recording and reproducing area are alternately arranged including:

a reading means for reading a recorded signal recorded on the optical disk;

a signal processing means for processing the signal read by the reading means in order to read address information;

an address information detecting means for detecting the address information from output processed by the signal processing means in response to a prescribed sampling clock.

Specifically, no clock extracted from the PLL are used, and external clocks are used for sampling. The adoption of this method makes the VFO areas unnecessary.

The recording density of ID is attenuated so that sampling may be possible by using external clocks. The dilution of the ID recording density enables to contain the effects of defects and to minimize errors. The remaining errors will be taken care of by the error correction process. As the disk is eccentric and ID channel bits on the disk and the sampling (external) clock are synchronized, the sampling clock is not on the optimum phase for sampling ID channel bits in the disk. In order to assure a precise phase locking and demodulation even if they are out of phase, the recording density is diluted as described above and moreover the detection of mark/space differences will be used.

And the PE (phase encoding) modulation in which the pit always consists of pairs of mark/space is used. And in order to avoid any phase shift between the sampling clock and ID channel bits from growing larger, edges containing phase information at the center of the pit (bit center of PE) are calculated by difference, and a sampling timing compensation will be performed.

Moreover, according to the present invention, it is possible to eliminate the effects of defects to the whole address area in a high-density optical disk. And an attenuation of density enables to reduce relatively errors due to the effects of defects and the correction of remaining errors enables to reduce errors in reading addresses. Sampling and demodulation can be performed precisely without using PLL.

DESCRIPTION OF THE PREFERRED EMBODIMENTS

Referring to the drawings, preferred embodiments according to the present invention will be explained in detail.

Figure 2:
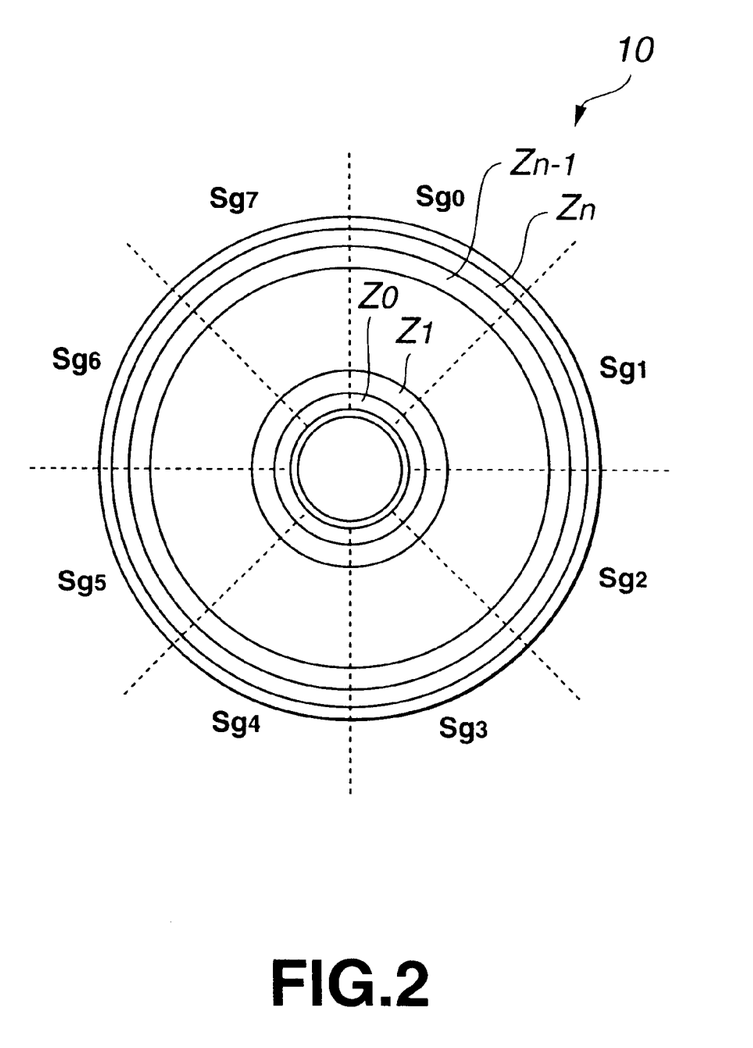
FIG. 2 is a disk format diagram of an embodiment of the optical disk according to the present invention.

To begin with, referring to FIG. 2 and FIG. 3, specific embodiments of optical disk according to the present invention will be explained.

A round of track in the embodiment of this optical disk consists of eight segments $Sg_0 \sim Sg_7$. A segment $Sg_i$ consists of an address area AR2 formed by an embossed pit and a user's area AR1 in which a groove G and a land L are spirally formed. The spiral groove G and land L are wobbled at a fixed frequency. This wobble frequency is used as a recording and reproduction clock and also as a sampling clock for ID information described below in the address area AR2.

From the inner track to the outer track, the user's area AR1 of a disk is divided into n+1 zones from $Z_0$ to $Z_n$. In the innermost zone $Z_0$, the groove G is wobbled at a rate of 420 waves for a segment $Sg_i$ and 3,360 waves for a round. In the zone $Z_i$, the wobble frequency increases by 6 waves for a segment $Sg_i$ to total 426 waves for a segment and 3,408 waves for a round. In other words, as the zone number adds 1 to the outer track, the wobble frequency increases by 6 waves for a segment $Sg_i$ and 48 waves for a round. And the disk is formed in such a way that the wobble frequency of the innermost track of each zone $Z_i$ will be the same. In the zone $Z_n$, $420+6_n$ waves are formed for a segment and $3,360+48_n$, waves are formed for a round.

The address area AR2 is formed in the CAV mode or radially in a zone $Z_i$. The address information for the groove G is written as the groove header $H_g$ and that for the land L is given as the land header $H_L$. And this address area AR2 is formed in such a way that the density of the innermost track in each zone $Z_n$ may be the same.

Figure 3A:
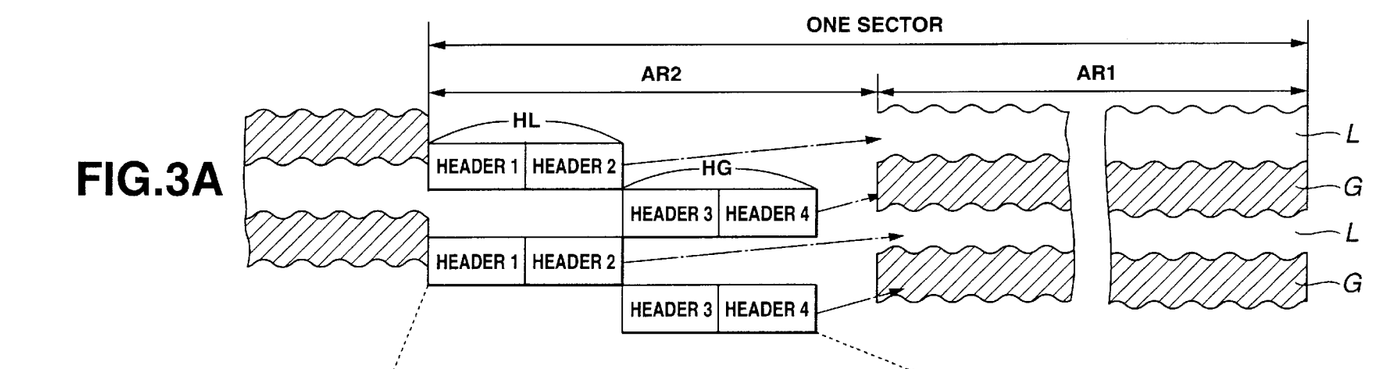
FIG. 3A and FIG. 3B are format diagrams of the address area and the users area of the optical disk.
Figure 3B:
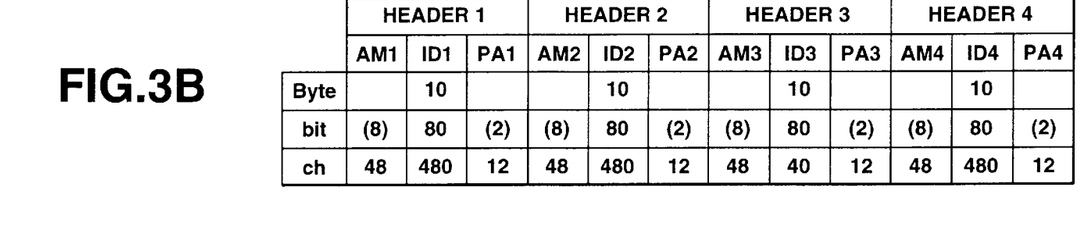

As shown in FIG. 3A, in this optical disk, the header $H_L$ (header 1 and header 2) of the address area AR2 shows the address of the succeeding land L. And the header $H_G$ (header 3 and header 4) shows the address of the succeeding group G.

In this address area AR2, the prior VFO is deleted. In other words, as shown in FIG. 3B, the header 1 of the header H1 consists of an address mark (AM) 48 channel bits which is a synchronization signal for headers, ID 10 bytes (480 channel bits) for a physical ID (PID) which is track address, sector address or segment address and PED which is a parity thereof (PID error detection code) and other ID information and postamble PA 12 ch added for modulation terminals. The remaining header 2 of the header $H_L$ is configured in the same was as the header 1, and a same ID is recorded twice on these headers. And the relationship between the header 3 and the header 4 of the header $H_L$ is the same.

Here, ID are modulated not by eight-fourteen modulation (EFM) but by phase encoding (PE). The PE modulation method is a method designed to ensure that a reversal always occurs at the center of a bit. When same signals continue, there occurs another reversal at the boundary of data bits. Table 2 shows the number of bytes, bits and channel bits allocated to various parts composing a header.

TABLE 2

| | | | |
|---|---|---|---|
| AM1 | | −8 | 48 |
| ID1 | 10 | 80 | 480 |
| PA1 | | −2 | 12 |
| AM2 | | −8 | 48 |
| ID2 | 10 | 80 | 480 |
| PA2 | | −2 | 12 |
| Total | bytes | 180 bits | 1,080 ch |

TABLE 3

| | | | |
|---|---|---|---|
| VFO1 | 36 | 288 | 576 |
| AM1 | 3 | 24 | 48 |
| ID1 | 10 | 80 | 160 |
| PA1 | 1 | 8 | 16 |
| VFO2 | 8 | 64 | 128 |
| AM2 | 3 | 24 | 48 |
| 1D2 | 10 | 80 | 160 |
| PA2 | 1 | 8 | 16 |
| Total | 72 bytes | 576 bits | 1,152 ch |

Figure 4:
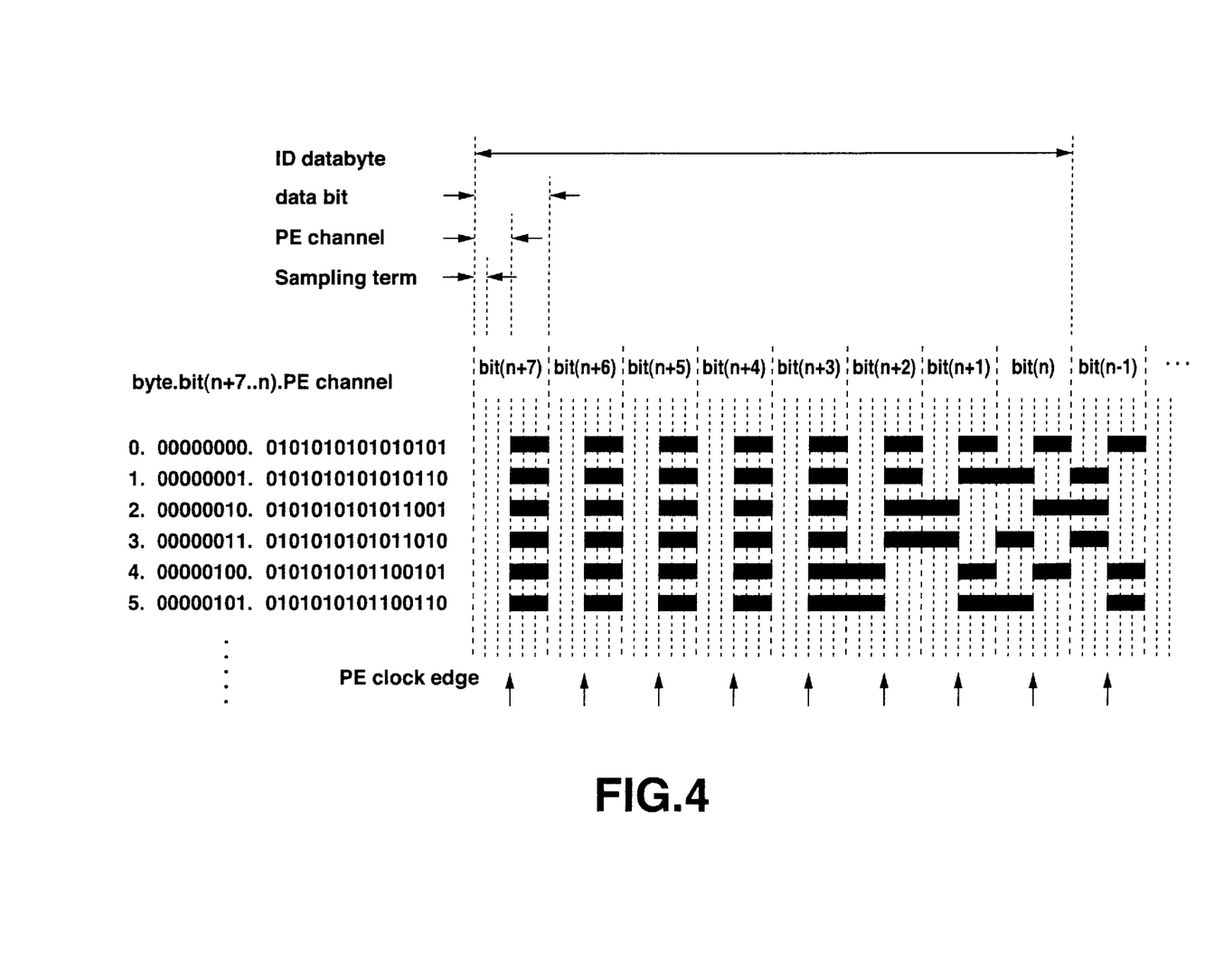
FIG. 4 is a diagram showing the pit pattern of address information in the address area.

The recording bits of ID information contained in this Table 2 will be explained by referring to FIG. 4. FIG. 4 shows a part of the bit pattern of ID information contained in Table 2 above, and does not show AM. The VFO area does not exist from the beginning. The ID information is modulated by PE for each bit, and bits are formed by recording pattern corresponding to three data channel bits for each PE channel bit. In other words, the data (8 bits) "00000000" for byte 0 are modulated by PE into PE channel bits of "0101010101010101," and then their channel density is reduced to ⅓ of the channel density of the user data before being recorded. Marks and spaces will exist with a same length in a bit. The data "00000001" in byte 1 are modulated by PE into "0101010101010110," and then marks and spaces are formed in a bit as illustrated. The minimum mark length is 3T and the maximum mark length is 6T. But they exist only in the form of these 3T and 6T. Therefore, the window width of the clock can be widened to that corresponding to three channel bits.

Figure 5:
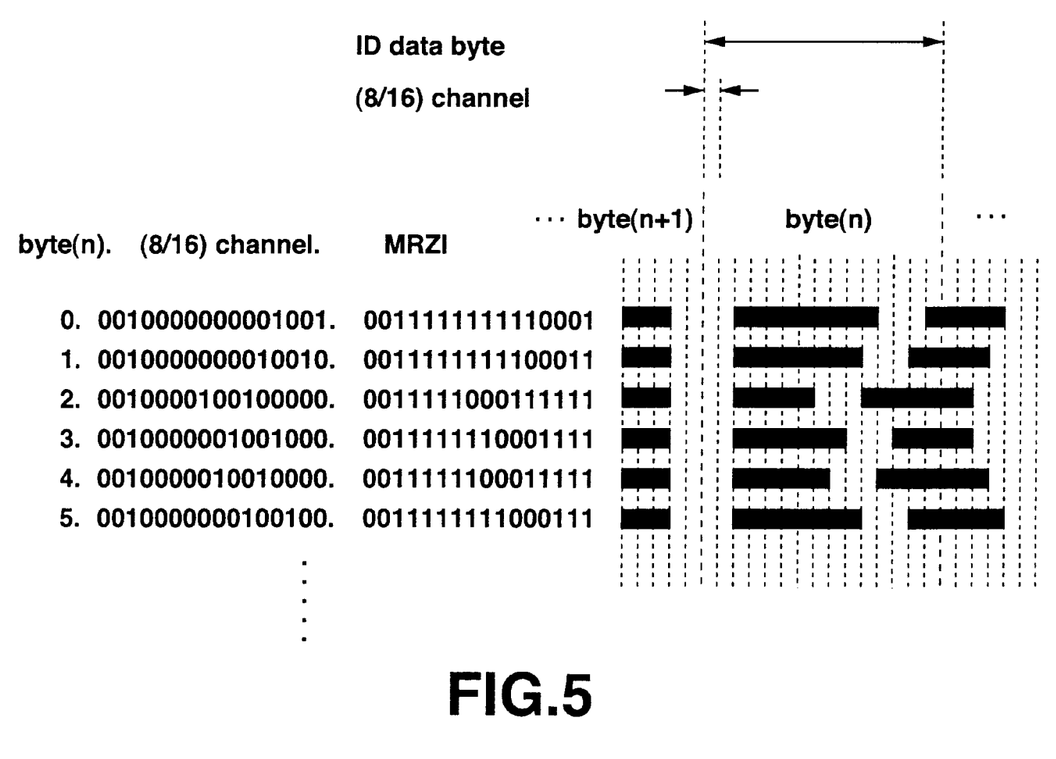
FIG. 5 is a diagram showing the pit pattern of address information in the address area on a prior optical disk.

The pit pattern of a prior art mentioned in Table 1 above will be shown in FIG. 5 as a comparative example 1. This comparative example is based on the EFM (eight-fourteen modulation) method as mentioned above, 1 byte=8 bits of the ID will be modulated into 16 channel bits. Moreover, the pit will be formed by the recording pattern modulated by the NRZI method. For example, data of byte 0 will be modulated by the EFM (eight-fourteen modulation) method into "0010000000001001," and will be further modulated by the NRZI method into "0011111111110001." And data of 1 byte will be modulated by the EFM (eight-fourteen modulated) method into "0010000000010010," and will be further modulated by the NRZI method into "0011111111100011." Therefore, the bit pattern is 3T, 4T, 5T, 6T, . . . As a result, the window width of the clock is limited to only 1.

Incidentally, at a high density where any defect will produce a heavy effect, the presence of a defect in the ID area in the latter half of the header 1 shown in FIG. 1A not only results in a mistaken ID in the header 1 but also in unlocking the PLL disabling to reproduce ID in the header 2. If the ID in the header 1 can be corrected, at least one ID can be reproduced. In consideration of such eventuality, it is preferable to transform the ID into an error-correction code. Thus, in comparison with the prior art shown in FIG. 1 and Table 1 (comparative example 1), another comparative example 2 shown in Table 3 is possible. For example, 4 parities are added for the correction of 2 bytes to the DVD-RAM format so that the ID may contain 10 bytes. At this time, 2 parities are left as a margin for reducing error corrections with a composition similar to that of EDC in Table 1 above. Here, an efficient RS (Read Solomon) code is considered for the error-correction code.

In this comparative example 2, VFO1 and VFO2 are left as they were before. However, even if the error-correction capability for ID1 and ID2 has improved, the number of channel bits for VFO remains still large and therefore the whole setup is inefficient. And like the comparative example 1, a recording pattern obtained as a result of an EFM (eight-fourteen modulation) and then another NRZI modulation is used to form the pit, so that the pit pattern is 3T, 4T, 5T, 6T, . . . . Therefore, the clock window width is still narrow being just enough for a channel bit.

Against these comparative example 1 and comparative example 2, the specific example of optical disk in this embodiment eliminates the VFO and provides a PE modulation for ID. And 1 channel bit of PE is made to correspond to 3 channel bits of the user data diluting the recording density of ID. In other words, by means of PE modulation, 1 bit is made to correspond to 2 channel bits, and in addition the channel bit density is reduced to ⅓ of the user data.

Subject to variations depending on the way errors propagate, the data density of ID information in the optical disk in the embodiment above (format shown in Table 2) is reduced to ⅓ of the comparative example 2 (format shown in Table 3), and therefore the number of errors on ID resulting from defects will be ⅓ in comparison with the comparative example 2 shown in Table 3. In the optical disk of the embodiment, when random errors are sufficiently few as compared with burst errors resulting from defects, the random errors can be sufficiently corrected.

When extreme cases are considered with regard to burst errors resulting from defects, while errors corresponding to 3 bytes length in the comparative example 2 shown in Table 3 cannot be corrected, the optical disk shown in Table 2 above can correct them because they correspond to 1 byte length. Thus, the elimination of VFO and a corresponding dilution of the ID density can improve the strength against burst errors resulting from defects.

And in the comparative example 2 shown in Table 3 above, the presence of any defects in the areas related to PLL locking, particularly in the VFO area inhibits sampling and reproduction of the whole ID. On the other hand, in the optical disk shown in Table 2 above, the absence of VFO makes PLL circuit useless on the reproducing apparatus side and enables to sample by means of for example a sampling clock obtained from the wobble signals.

Another concrete example of optical disk among the embodiments of the invention will be explained. This is a case of enhancing the error-correction capability of ID in place of multiple writes.

For example, as shown in Table 4, 8 parities are added so that it may be possible to correct 4 bytes.

TABLE 4

| | | | |
|---|---|---|---|
| AM1 | | −8 | 48 |
| ID1 | 14 | 112 | 672 |
| PA1 | | −2 | 12 |
| Total | | | 732ch |

Forty-eight channel bits are allocated to AM1, 672 channel bits to ID1 and 12 channel bits to PA1 for a total number of 732 channel bits allocated. Errors resulting from an extremely large defect are likely to produce errors in both neighboring headers due to multiple writes. And it will be meaningless unless the headers are separated by a certain distance from the beginning. On the other hand, it is possible to address to not so great errors by improving the error-correction capability, and therefore the method mentioned above is effective.

Then, a mastering device used to produce optical disks in which address areas AR2 and user's areas AR1 are formed will be described. Optical disks are produced by exposing the original recording of disk with a mastering device.

Figure 6:
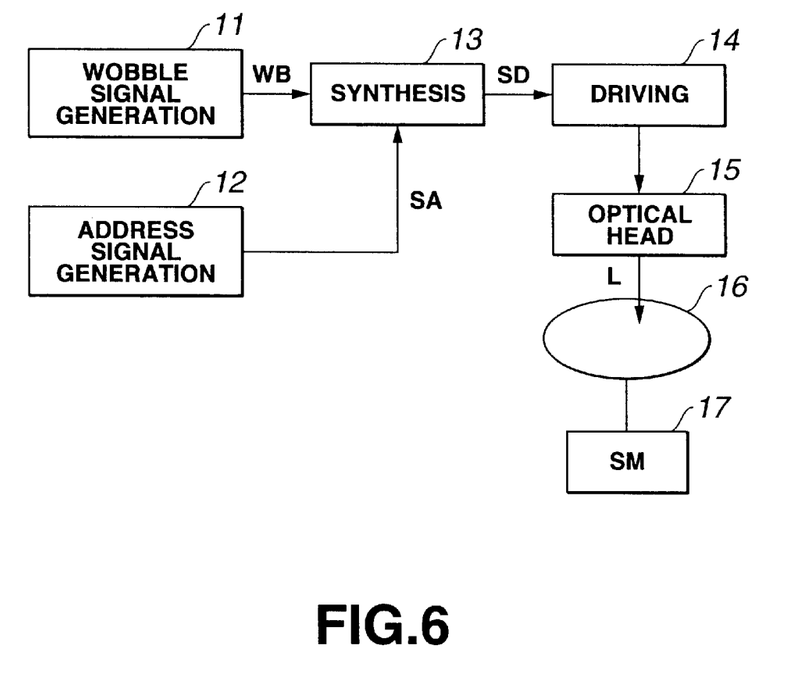
FIG. 6 is a block diagram of a mastering apparatus used for manufacturing the optical disk.

As shown in FIG. 6, a mastering device includes a wobble signal generating circuit 11, address signal generating circuit 12, a synthesis circuit 13 for synthesizing signals supplied by the wobble signal generating circuit 11 and the address signal generating circuit 12 and outputting a driving signal SD, a driving circuit 14 for driving an optical head 15 based on the driving signal SD, a spindle motor 17 for rotationally driving the original recording of disk 16, and a system control circuit not illustrated.

The wobble signal generating circuit 11 outputs sine wave signals of a specified frequency synchronized to the rotation of the disk original recording 16 as wobble signals WB. And the wobble signal generating circuit 11, in response to zoning, gradually amplifies the frequency of the wobble signal WB and outputs the same. Thereupon, the wobble signal generating circuit 11 displaces the position of irradiating laser beam by this wobble signal WB, and makes the groove G meander for a specified cycle for each sector.

The address signal generating circuit 12, under the control of a system control circuit not illustrated, generates address signals A whose value changes successively in response to the displacement of an optical head 15. To be more specific, the address generating circuit 12 receives timing signals consisting of FG signals synchronized to the rotation of the disk original recording 16 from the spindle motor 17, counts these timing signals by means of a specified counter to generate an address data ID showing the irradiating position of laser beam. At this moment, the address signal generating circuit 12 creates header information of the composition shown in Table 2 or Table 4, and convert the same to specified channel bit data by means of the PE modulation.

And the address signal generating circuit 12 supplies this modulation output to the synthesis circuit 13 as address signal A. The synthesis circuit 13 outputs this address signal A with a timing corresponding to the scanning of the laser beam L.

The driving circuit 14 zones the disk original recording 16 by switching the driving conditions of the optical head 15 in response to the laser beam irradiating position with a timing synchronized to the rotation of the disk original recording 16. To be specific, the driving circuit 14 switches the driving conditions of the optical head 15 so that the information recording surface of the disk original recording 16 may be divided into radiate areas to form a sector structure. And by gradually varying this switching timing from the inner track to the outer track, the driving circuit 14 divides the information recording surface on a concentric circle to create a plurality of zones $Z_0$~$Z_n$.

And the driving circuit 14, following the control of the system control circuit, displaces the laser beam irradiating position in this user's area AR1 by means of the driving signal SD to make the groove G meander.

The disk original recording 16 is made, for example, of a glass substrate on the surface of which photoresist is applied. The disk original recording 16 is rotationally driven at a fixed angular speed by means of the spindle motor 17. And the optical head 15 irradiates laser beam L on the disk original recording 16 by displacing gradually from the inner track to the outer track of the disk original recording 16 by synchronizing with the rotation of this disk original recording 16 by means of a specified thread mechanism. In this way, the optical head 15 creates a spiral track from the inner track to the outer track of the disk original recording 16.

By going through the above procedure, the mastering device can make the optical disk by irradiating laser beam L on the disk original recording 16.

And now a specific example of an optical disk recording and/or reproducing apparatus for recording and/or reproducing data on the optical disk will be described.

Figure 7:
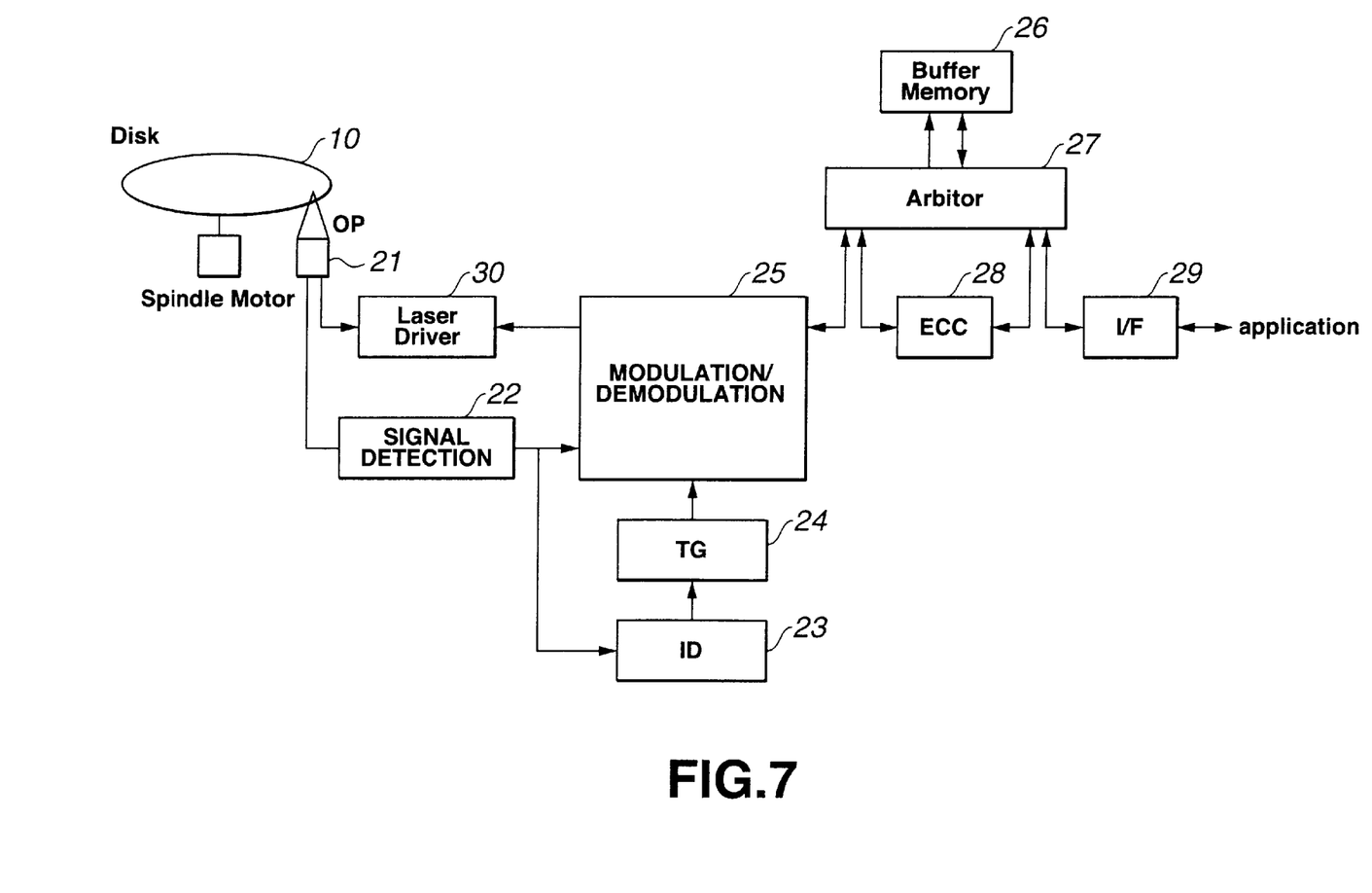
FIG. 7 is a block diagram of an optical disk recording and/or reproducing apparatus for recording and/or reproducing data in the optical disk.

The optical disk recording and/or reproducing apparatus serving for this specific example includes, as shown in FIG. 7, an optical head (OP head) 21 for adequately irradiating laser beam in order to read and write signals on the signal recording surface of the optical disk 10, a signal detecting circuit for detecting RF signals from the signals read by the OP head 21 and converting the same into digital data, and for detecting wobble signals or servo signals from the signals read by the OP head 21, an ID detection part 23 for detecting channel bits of track address or sector address which are ID information from the address area AR2 among the digital data from this signal detecting circuit 22 and for creating ID bit data, a timing generator 24 for generating timing pulse based on the ID bit data supplied by the ID detector 23, and modulator/demodulator part 25 for demodulating the digital data in response to the address based on the timing pulse supplied by this timing generator 24 and modulating data for recording.

And this optical disk recording and/or reproducing apparatus includes a buffer memory 26 for storing temporarily recording data and reproduction data, an arbiter circuit 27 for arbitrating demands to read and/or write various data to this buffer memory 26, an error-correction circuit (ECC) 28 for correcting errors in the data for recording and data for reproduction, and an interface (I/F) 29 with the external systems.

The OP head 21 consists of an optical system of a high numerical aperture (NA) designed to focus laser beam driven by the laser driver 30 on the information recording surface of the optical disk 10, and receives the return beam of this laser beam. The OP head 21 thus designed generates tracking error signals whose signal level varies depending on the amount of tracking errors and focus error signals whose signal level varies depending on the amount of focus errors, and the optical system driven in response to these tracking error signals and focus error signals enables to the OP head 21 to control tracking and focusing.

And the OP head 21 makes the intensity of laser beam to rise intermittently in response to the modulation signals outputted by the modulator/demodulator circuit 25, and thereby creates successively the pit corresponding to the modulation signals on the information recording surface of the optical disk. At this moment, the OP head 21 creates the pit successively by irradiating shortwave laser beam through an optical system of a high numerical aperture and thereby records the user data at a high density.

And the OP head 21 irradiates laser beam at a constant intensity at the time of reproduction, and outputs reproduction signals RF whose signal level varies in response to the intensity of the return beam to the signal detecting circuit 22.

In such an optical disk recording and/or reproducing apparatus, the buffer memory 26 temporarily holds the user data inputted and outputted between the apparatus proper and computer and other external devices.

The error-correction circuit (ECC) 28 receives the user data through a buffer 26 whose function of exchanging data is controlled by the arbiter circuit 27 at the time of recording and transform these user data into a specified ECC format.

The error-correction circuit (ECC) 28 interleaves the ECC block data thus generated at the time of recording and outputs the same. In addition, the circuit adds a parity of specified words to each ECC block and output the same.

At the time of reproduction, on the other hand, the error-correction circuit 28 deinterleaves the data for reproduction that had been demodulated by the modulator/demodulator circuit 25 and stored in the buffer memory 26 through the arbiter circuit 27. And the error-correction circuit 28 processes these data for reproduction for error correction by the ECC block, selects the user data from the result of processing and outputs the same to the buffer memory 26.

The modulator/demodulator circuit 25 modulates the output data of the error-correction circuit 28 by a modulation method suited to the optical disk 10 during recording, and converts the modulated data obtained thereby into a serial data train and output the same. And the modulator/demodulator circuit 25 demodulates the output data of the signal detecting circuit 22 during reproduction and obtains the data for reproduction and outputs the data for reproduction in parallel.

The ID detection part 23 detects the address data ID following the address mark AD stored in the address area of the optical disk 10, samples the ID following the address mark by using a data clock corresponding to the frequency of the wobble signal detected at the signal detecting part 22 to obtain ID information.

Figure 8:
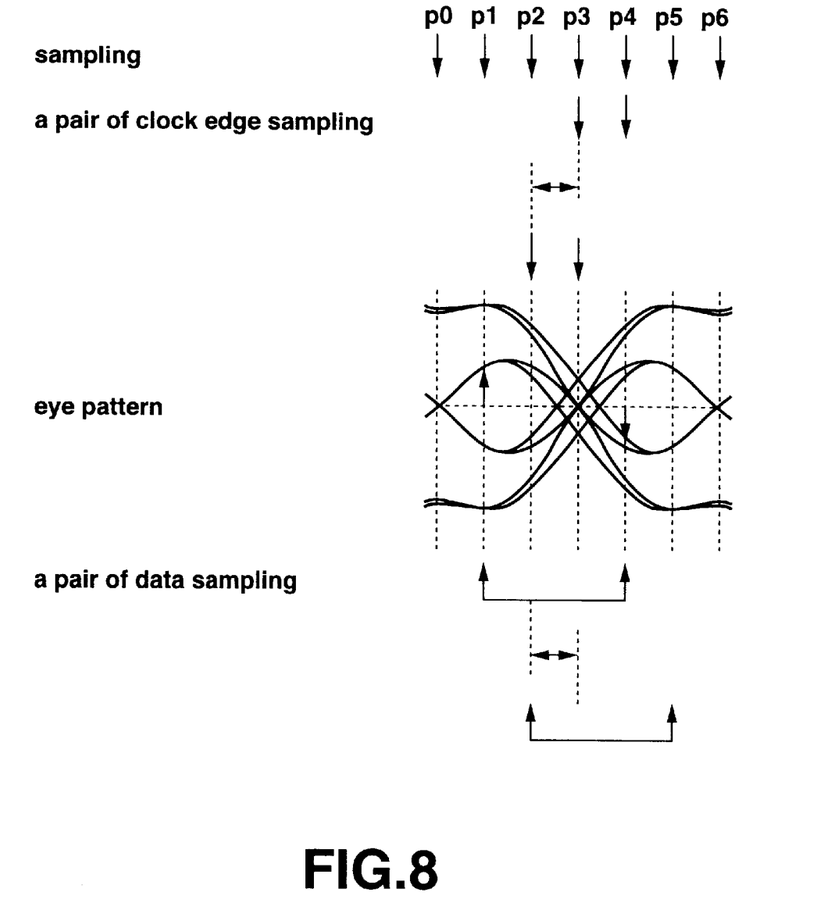
FIG. 8 is a diagram for illustrating the reproduction signal and sampling timing of the address area on the optical disk.

The principle of operation in this ID detection part 23 will be described below. FIG. 8 shows the signal for reproduction and sampling in the header ID portion. PE converts the data bits "0" and "1" into channel bit trains "01" and "10," and records "0" and "1" of the channel bit by making them correspond to the presence or absence of bit (mark/space). Therefore, there always occurs inversion at the center of the data bit. The data are reproduced while timing correction continues by taking the inversion position as the edge. For detecting the edge, it must be determined whether the value sampled in the window has crossed 0(zero). Or it is necessary to find out the position where the difference of values sampled in the window is the maximum. The window is created in the vicinity of the bit center position forecasted by a timing corrected in advance. At the beginning the timing is fixed by the AM. Although the sampling frequency involves shifts due to eccentricity, more or less desired one can be used. The sampling phases do not agree. The sampling pair determined to be edges after all are in the range from "detected at p2 and p3" to "detected at p3 and p4."

The data for PE demodulation are demodulated by examining the polarity of difference between values sampled on both sides of the edge. When a pair of clock edge sampling are "p2 and p3," it is necessary to examine the difference between a pair of data sampling "p1 and p4." When a pair of clock edge sampling are "p3 and p4," it is necessary to examine the difference between a pair of data sampling "p2 and p5." Depending on whether the difference is + or −, the PE demodulated channel bit can be "01" or "10," or in other words, the demodulated data bit can be "0" or "1." The reproduction signals and sampling timing are, as described above, successively in the range of "p1 and p4," and "p2 and p5." However, whatever may be the phase relationship, the difference allows to reproduce the correct values.

Figure 9:
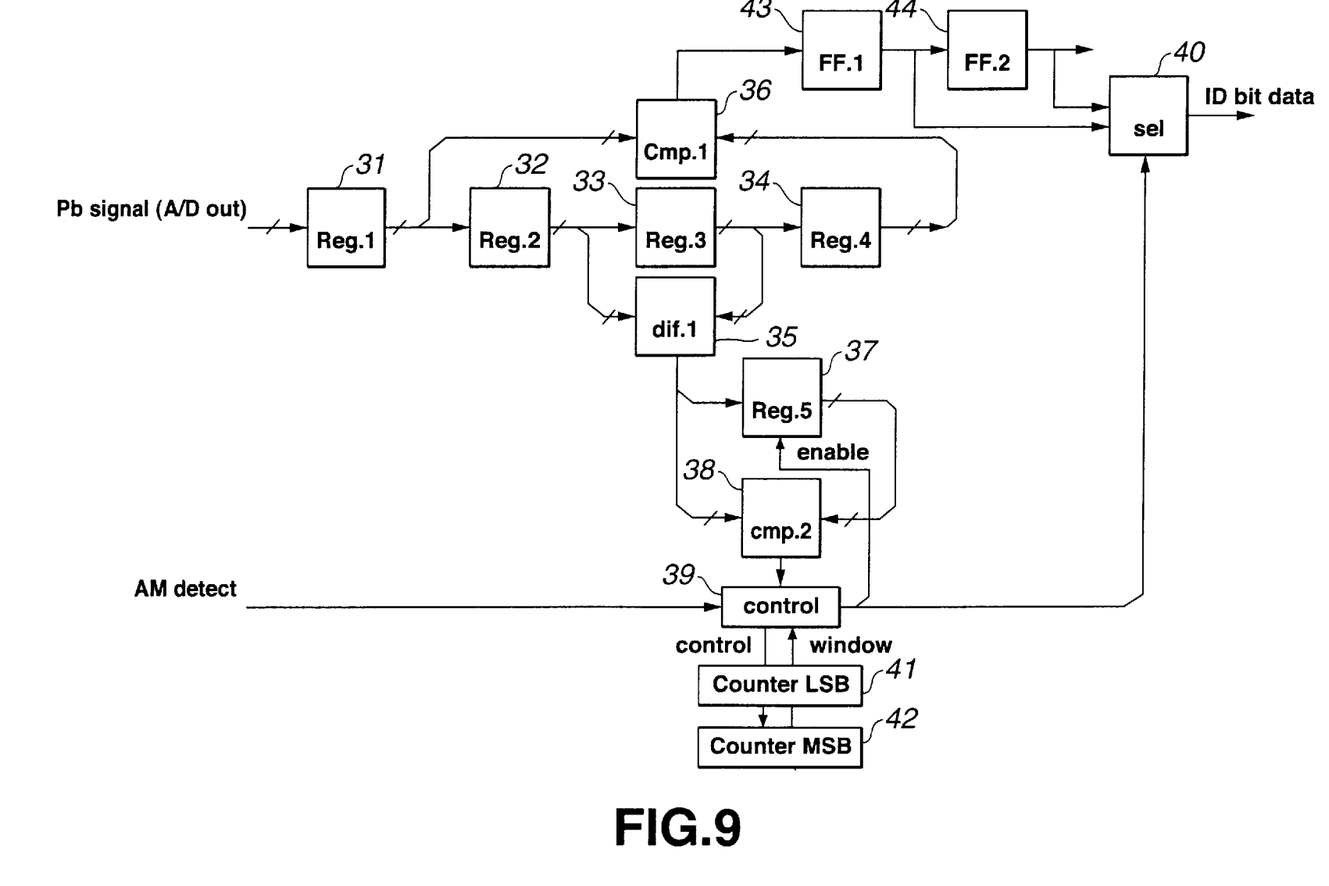
FIG. 9 is a circuit diagram showing a detailed configuration of an ID detector for constituting the optical disk recording and/or reproducing apparatus.

The detail circuit configuration of the ID detector 23 is shown in FIG. 9.

The reproduction signals of the header ID information detected at the signal detector 22 (Pb signal (A/D out)) are inputted in 4-stage registers (Reg. 1–Reg. 3) 31, 32, 33 and 34. The difference between the value of the second stage register (Reg. 2) and that of the third stage register (Reg. 3) 33 is calculated by the difference detector (dif. 1) 35, and based on the calculation result the edge is identified. As the value obtained by the difference detector (dif. 1) 35 depends on the edge inclination, the value may be positive or negative. The difference here may be the absolute value of difference. The signal is not reversed by the adjacent timing.

And the value of the first stage register (Reg. 1) 31 and that of the fourth stage register (Reg. 4) 36 are compared by the comparator (cmp. 1) 36, and based on the result of comparison the data are reproduced. The output of comparison by this comparator may be limited to 1 bit of positive or negative information which is the result of difference comparison. In other words, it is either mark/space (111000) or space/mark (000111).

The counter (counter LSB) 41 counts a number of times enough for 1 bit of ID data, in other words 6 times. It creates the window for edge, and the maximum difference between the values of the second stage and the third stage is calculated by the controller (controll) 39. The window for edge is such that enables one to forecast the timing of the edge at the center of bit (timing when the difference will be the maximum) from the timing when the AM is detected. For example, a point between it and a point immediately before or after it and corresponding to a clock is taken as the window, and the counter is reset (loaded) at the point where the difference has actually become maximum.

The register (Reg. 5) 37 and the comparator (cmp. 2) 38 are used to calculate the maximum value of difference. The flip-flop (FF. 1) 43 and the flip-flop (FF. 2) 44 store the result of comparison between the first stage and the fourth stage, and when the edge timing is obtained, the corresponding result will be switched and outputted as ID bit data by the selector (sel) 40 controlled by the controller 39.

In the ID part, the controller 39 controls the counters by the edge timing obtained. At the beginning, AM is detected and the counters are initialized. The counter (counter MSB) 42 and the counter (counter LSB) 41 are used to synchronize all the headers.

Thus, in order to reproduce ID information, the optical disk recording and/reproducing apparatus does not use the clock extracted from the PLL but samples ID information with outside clock. Therefore, the circuit size can be reduced. And as the optical disk does not require any VFO area in its prepit header, redundancy is reduced to that extent, the density of the ID area can be attenuated and the effect of defects can be reduced. And the effects of any defect are limited to the locality concerned. And the use of error-correction signals enables to correct local errors, and to reduce the ID error ratio.

What is claimed is:

1. An optical disk for use in a recording and/or reproducing apparatus that includes a reading unit configured to read a recorded signal recorded on said optical disk, a signal processing unit configured to process the recorded signal to read address information, and an address information detecting unit configured to detect address information from an output processed by the signal processing unit in response to an externally generated sampling clock, said optical disk comprising:

address information areas having the address information recorded therein; and recording and reproducing areas alternately arranged on the disk with the address information areas, wherein an address for indicating the start of recording and reproducing areas is are respectively arranged at the head of said address information areas, and the address marks are followed by said address information in the address information areas.

2. The optical disk according to claim 1, wherein said address information is recorded in pairs of mark/space by phase encoding modulation.

3. The optical disk according to claim 1, wherein an amount of said address information to fill a channel bit is made to correspond to the data for a plurality of channel bits recorded in said recording and reproducing areas.

4. The optical disk according to claim 1, wherein said address information is coded for error-correction coding.

5. A recording and/or reproducing apparatus for recording and/or reproducing data on an optical disk in which address information areas and a recording and reproducing areas are alternately arranged, said apparatus comprising:

a reading means for reading a recorded signal recorded on said optical disk;

a signal processing means for processing the signal read by said reading means in order to read address information;

an address information detecting means for detecting said address information from an output processed by said signal processing means in response to a an externally generated sampling clock.

6. The recording and/or reproducing apparatus according to claim 5, wherein the recording and reproducing areas are formed by wobbled grooves, and said address information detection means detects said address information in response to the sampling clock based on a wobble frequency of the groove detected by said signal processing means.

7. The recording and/or reproducing apparatus according to claim 5, wherein said address information is stored in said optical disk in pairs of mark/space by phase encoding modulation, and said address information detection means demodulates the address information by detecting difference among the pairs of recorded mark/space.

8. The recording and/or reproducing apparatus according to claim 5, wherein said address information is stored in said optical disk in pairs of mark/space by phase encoding modulations and said address information detection means samples a channel bit by taking the boundary of pairs of modulated marks/spaces as the edge of the bit center and by correcting sampling timing.

9. A recording and/or reproducing method for recording and/or reproducing data on an optical disk in which address information areas and a recording and reproducing areas are alternately arranged, comprising the steps of:

processing the signal read from said optical disk in order to read address information; and detecting said address information from an output processed by said signal processing step in response to an externally generated sampling clock.

* * * * *

UNITED STATES PATENT AND TRADEMARK OFFICE
CERTIFICATE OF CORRECTION

PATENT NO.      : 6,628,586 B1
DATED           : September 30, 2003
INVENTOR(S)     : Susumu Senshu It is certified that error appears in the above-identified patent and that said Letters Patent is hereby corrected as shown below:

<u>Column 11,</u>
Line 17, change "address for" to -- address marks for --;
Line 18, change "areas is are respectively" to -- areas are respectively --.

Signed and Sealed this

Twenty-second Day of June, 2004

JON W. DUDAS
*Acting Director of the United States Patent and Trademark Office*